United States Patent
Kummer et al.

(10) Patent No.: US 6,808,055 B1
(45) Date of Patent: Oct. 26, 2004

(54) FRICTION CLUTCH WITH INSTALLATION DEVICE

(75) Inventors: Martin E. Kummer, Auburn, IN (US); Daniel V. Gochenour, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/427,127

(22) Filed: Apr. 30, 2003

(51) Int. Cl.[7] ................................................ F16D 3/14
(52) U.S. Cl. ............................... 192/105 C; 192/93 R; 192/105 CP; 192/109 R
(58) Field of Search .................. 192/105 C, 105 CP, 192/109 R, 83, 93 R; 29/464

(56) References Cited

U.S. PATENT DOCUMENTS

| | | |
|---|---|---|
| 2,216,771 A | 10/1940 | Evans |
| 2,218,379 A | 10/1940 | Evans |
| 2,224,440 A | 12/1940 | Lewis |
| 2,447,007 A | 8/1948 | Gravina et al. |
| 2,800,208 A | 7/1957 | Binder |
| 2,850,131 A | 9/1958 | Maurice et al. |
| 2,987,155 A | 6/1961 | Maurice et al. |
| 3,091,315 A | 5/1963 | Maurice et al. |
| 3,580,372 A | 5/1971 | Schiefer et al. |
| 4,754,665 A | 7/1988 | Vandervoort |
| 5,370,013 A | 12/1994 | Reynolds et al. |
| 5,974,354 A | 10/1999 | Janecke et al. |
| 5,974,906 A | 11/1999 | Stine et al. |
| 6,015,366 A | 1/2000 | Markyvech et al. |
| 6,609,602 B2 * | 8/2003 | Gochenour et al. ...... 192/105 C |

* cited by examiner

Primary Examiner—Saul Rodriguez
(74) Attorney, Agent, or Firm—Rader Fishman & Grauer PLLC

(57) ABSTRACT

An installation device for a centrifugal clutch is disclosed. In an embodiment of the invention, the centrifugal clutch includes a clutch cover, a pressure plate for applying a clamping force against a friction plate, and at least one flyweight that moves radially outward under the effects of centrifugal force to cause the pressure plate to exert a clamping force against the friction plate. The installation device includes an installation hub moveable relative to the clutch cover between a first position, wherein the installation hub is engaged with the flyweight to force the engaged flyweight to move radially outward, and a second position, wherein the installation hub is disengaged from the flyweight. A resilient member biases the installation hub toward the second position and is selectively engaged with the clutch cover to inhibit movement of the installation hub toward the first position.

16 Claims, 12 Drawing Sheets

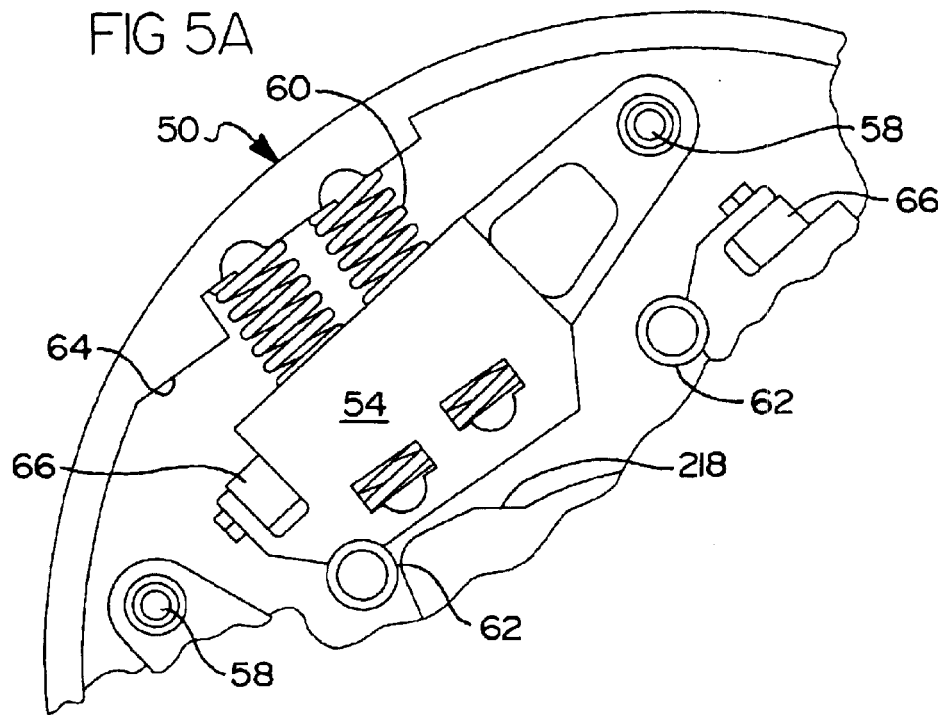
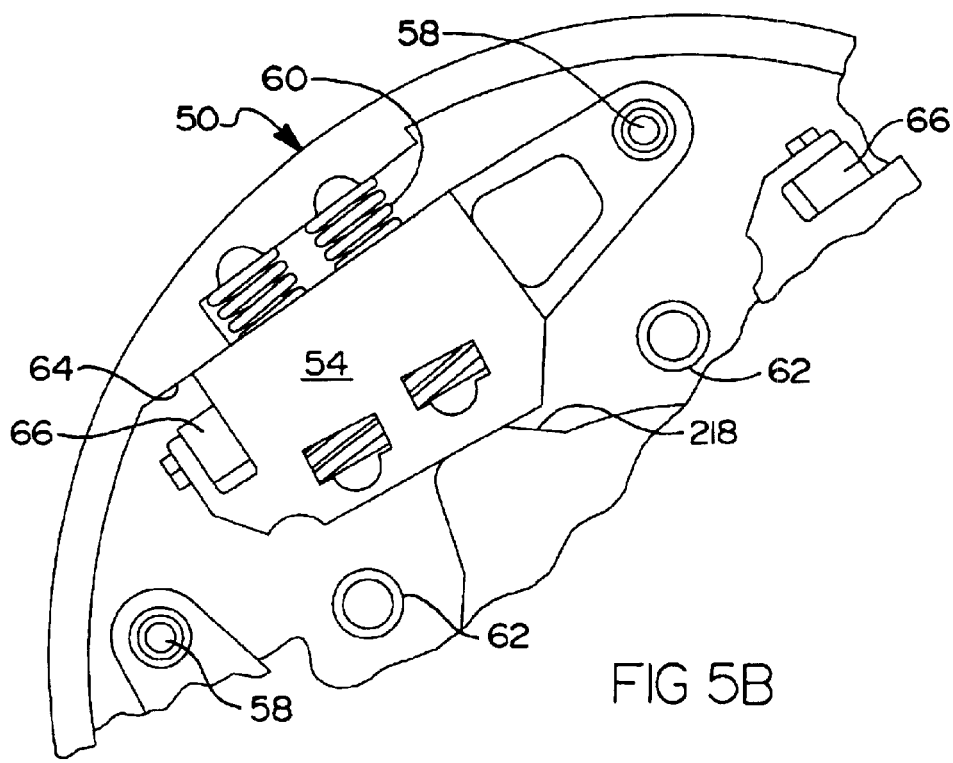

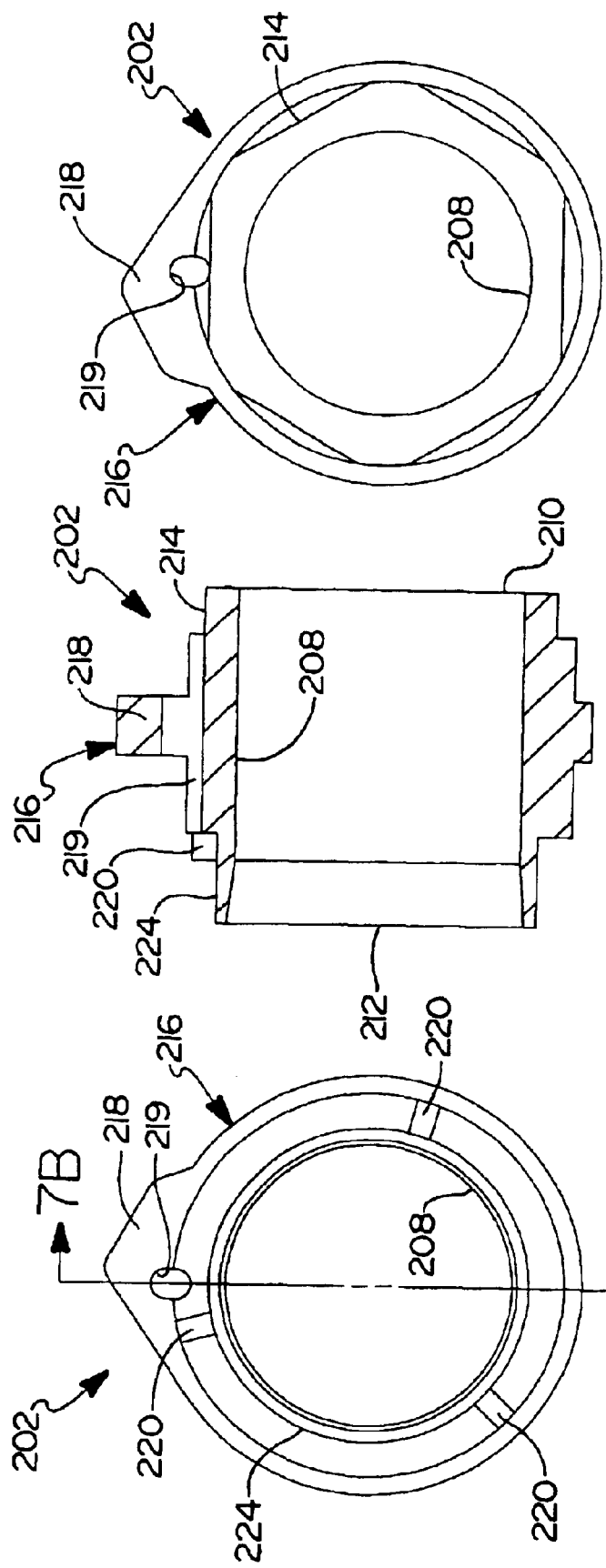

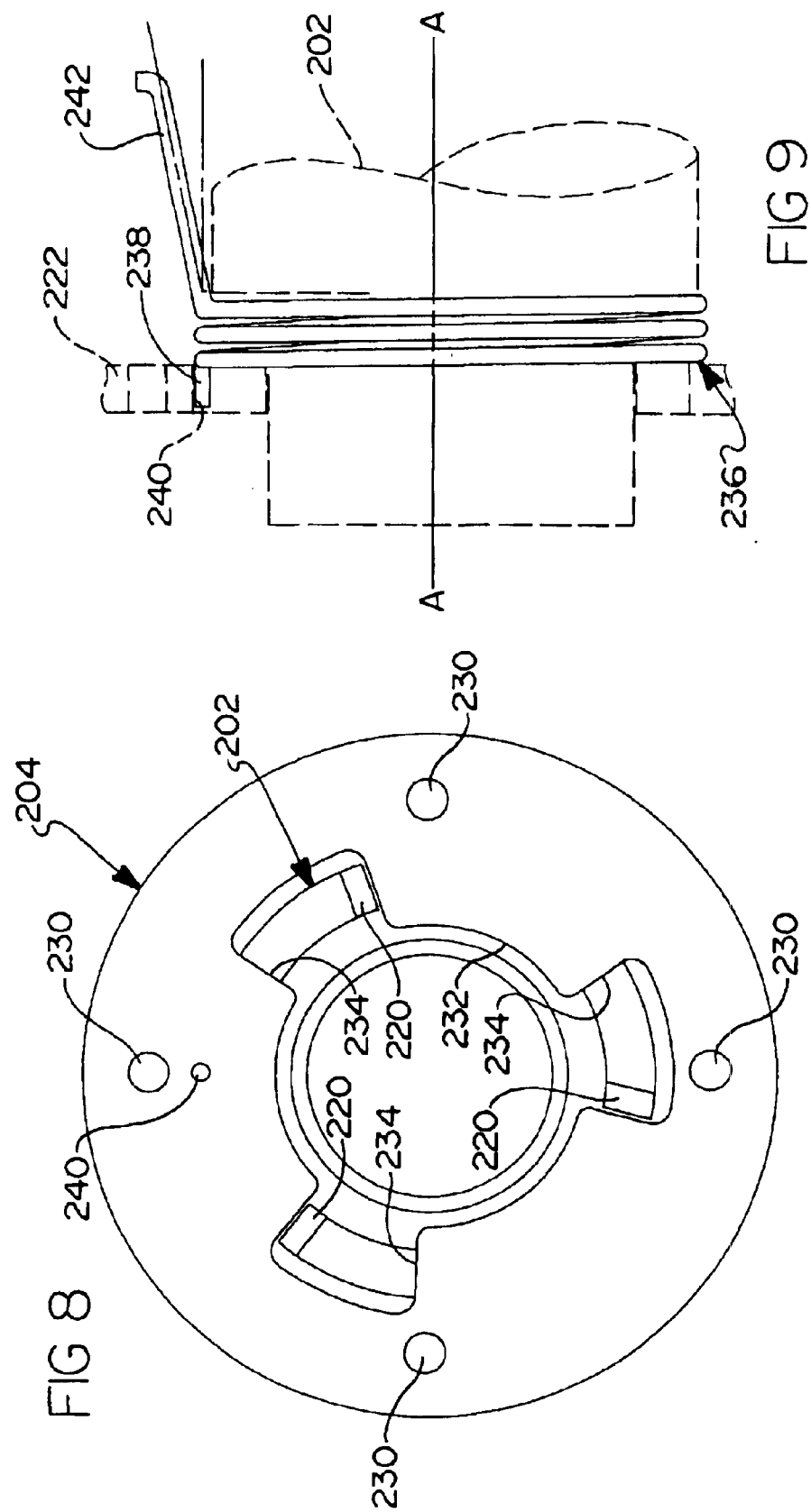

FRICTION CLUTCH WITH INSTALLATION DEVICE

FIELD OF THE INVENTION

The present invention relates generally to a master friction clutch for a vehicle drive-train system and more particularly to a centrifugal master friction clutch having means for installing the clutch in a vehicle drive-train system.

BACKGROUND OF THE INVENTION

Vehicle drive-train systems that include an internal combustion engine, a master friction clutch and a transmission are known in the art. Master friction clutches generally include a cover assembly having a pressure plate, a cover and a diaphragm spring, all coupled for rotation together with an engine flywheel. A typical master friction clutch also includes at least one friction plate, commonly called a driven disc, having at its outer periphery friction pads and at its inner periphery a hub that is mounted on a driven member, such as a transmission input shaft. When the clutch is disengaged, the pressure plate is axially removed from the friction plate and no torque is transferred between the engine flywheel and the friction plate. When the clutch is engaged, the pressure plate applies a clamping force against the friction plate causing the engine flywheel and friction plate to contact and transfer torque therebetween.

Normally closed (engaged) clutches generally include a release member, such as a bearing mechanism, to selectively disengage the clutch under direction of the vehicle operator. An exemplary procedure for installing a normally closed clutch in a vehicle drive-train system includes: (i) installing the friction plate(s) on a temporary installation shaft; (ii) securing the clutch cover assembly to the flywheel to clamp the friction plate(s) between the flywheel and a pressure plate; and (iii) removing the installation shaft to permit insertion of a transmission input shaft. The friction plate(s) are held in position after removal of the installation shaft by the clamping force of the pressure plate until the transmission can be installed into the vehicle drive-train system.

Normally open (disengaged) clutches, such as centrifugally operated friction clutches, are also known in the art. Centrifugally operated clutches generally include an input member driven by an internal combustion engine and weights pivotable with respect to the input member which, upon rotation of the input member, will rotate or pivot radially outward under the effect of centrifugal force to cause the input member to frictionally engage an output member. Unlike a normally closed (engaged) clutch, the pressure plate in a normally open (disengaged) clutch does not exert a clamping force on the friction plate(s) until the clutch is engaged. Thus, securing the clutch cover assembly of a normally open (disengaged) clutch to the engine flywheel does not necessarily clamp the friction plate(s) between the flywheel and the pressure plate.

An installation device for use in a normally open (disengaged) clutch has been developed, the details of which are disclosed in pending U.S. patent application Ser. No. 09/943,497, filed Aug. 30, 2001 and published as U.S. 2003-0042108-A1, which is owned by the assignee of the present invention and is incorporated by reference in its entirety. While the noted installation device has improved installation of a normally open (disengaged) clutch into a vehicle drive-train system, designers continue to improve upon the design to facilitate assembly of the installation device into the clutch assembly.

SUMMARY OF THE INVENTION

An installation device for a centrifugal clutch is disclosed. In an embodiment of the invention, the centrifugal clutch includes a clutch cover, a pressure plate for applying a clamping force against a friction plate, and at least one flyweight that moves radially outward under the effects of centrifugal force to cause the pressure plate to exert a clamping force against the friction plate. The installation device includes an installation hub moveable relative to the clutch cover between a first position, wherein the installation hub is engaged with the flyweight to force the engaged flyweight to move radially outward, and a second position, wherein the installation hub is disengaged from the flyweight. A resilient member biases the installation hub toward the second position and is selectively engaged with the clutch cover to inhibit movement of the installation hub toward the first position.

BRIEF DESCRIPTION OF THE DRAWINGS

Embodiments of the invention will now be described, by way of example, with reference to the accompanying drawings, wherein:

FIGS. 5A and 5B are partial sectional views illustrating the position of the flyweights in the disengaged position and the engaged position, respectively.

FIGS. 7A, 7B and 7C are an elevational view of a second end, a cross-sectional view, and an elevational view of a first end, respectively, of an installation hub according to an embodiment of the invention.

FIG. 8 is an elevational view of the installation hub and a plate member according to an embodiment of the invention.

FIG. 9 is an elevational view of a torsion spring according to an embodiment of the invention.

DETAILED DESCRIPTION

Figure 1:
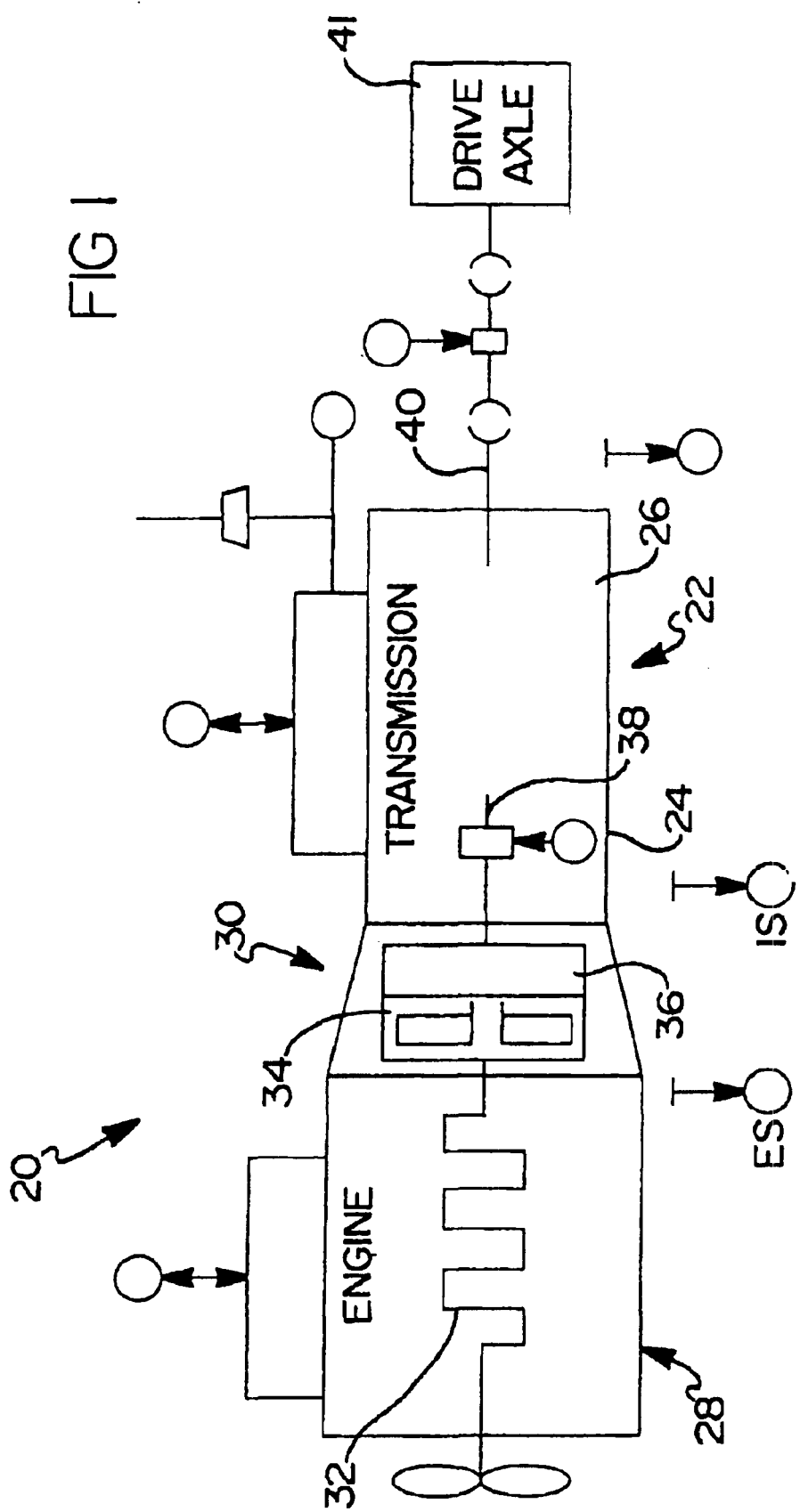
FIG. 1 is a schematic illustration of an exemplary vehicle drive-train system utilizing the centrifugal clutch of the present invention.

Referring now to the drawings, the preferred illustrative embodiments of the present invention are shown in detail. Although the drawings represent some preferred embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise forms or configurations shown in the drawings and disclosed in the following detailed description.

An exemplary vehicle drive-train system 20 using the centrifugally operated master friction clutch of the present invention is schematically illustrated in FIG. 1. In system 20, a multi-gear transmission 22 that includes a main transmission section 24 connected in series with a splitter-type auxiliary transmission section 26 is drivingly connected to an internal combustion engine 28, such as a gasoline or diesel engine, by a centrifugal master friction clutch 30. Engine 28 includes a crankshaft 32, which is attached to an input member 34 of centrifugal master friction clutch 30. Input member 34 frictionally engages with, and disengages from, an output member 36, which is attached to an input shaft 38 of transmission 22. A transmission output shaft 40 extends from the auxiliary transmission section 26 for driving connection to the vehicle drive wheels through a drive axle 41 or transfer case.

The terms "engaged" and "disengaged" as used in connection with a master friction clutch refer to the capacity, or lack of capacity, respectively, of the clutch to transfer a significant amount of torque. Mere random contact of the friction surfaces, in the absence of at least a minimal clamping force, is not considered engagement.

As shown in FIG. 1, centrifugal clutch 30 requires no external clutch actuator and is operated as a function of the rotational speed (ES) of engine 28. Centrifugal clutch 30 also requires no connections to operating linkages, command signal inputs, power electronics and/or fluid power conduits. While the most economical application of the present invention is with a dry friction clutch, the present invention is also compatible with wet clutch technology.

As is known, rotation of input portion 34 will cause clutch 30 to engage and drivingly connect an engine output member, typically an engine flywheel, to transmission input shaft 38. The clamping force (CF) and torque transfer capacity of clutch 30 is a function of the rotational speed (ES) of engine 28 and clutch input member 34. In the exemplary embodiment, clutch 30 reaches incipient engagement at an engine speed (ES) greater than engine idle and fully engages at an engine speed lower than the engine speed at which a first up-shift is required.

Figure 3:
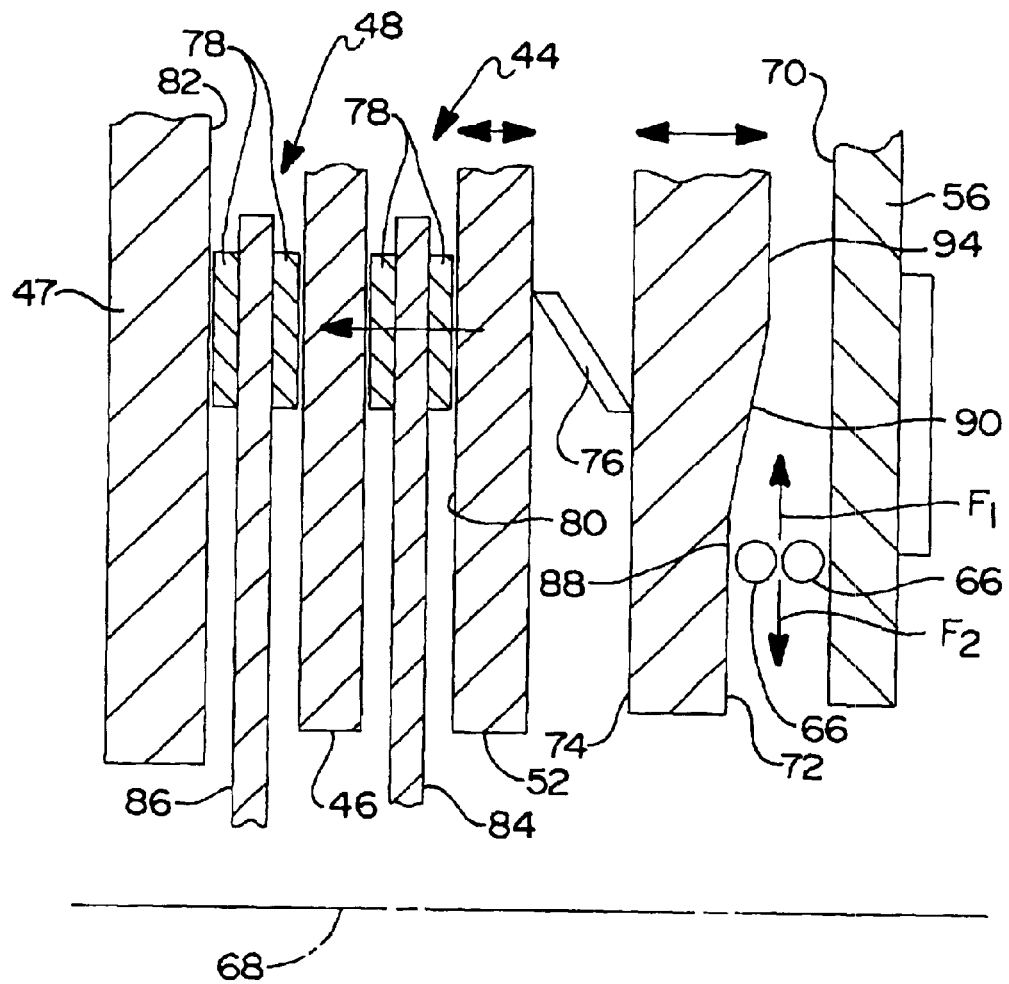
FIG. 3 is a schematic partial sectional view of a centrifugal clutch according to an embodiment of the invention.
Figure 4:
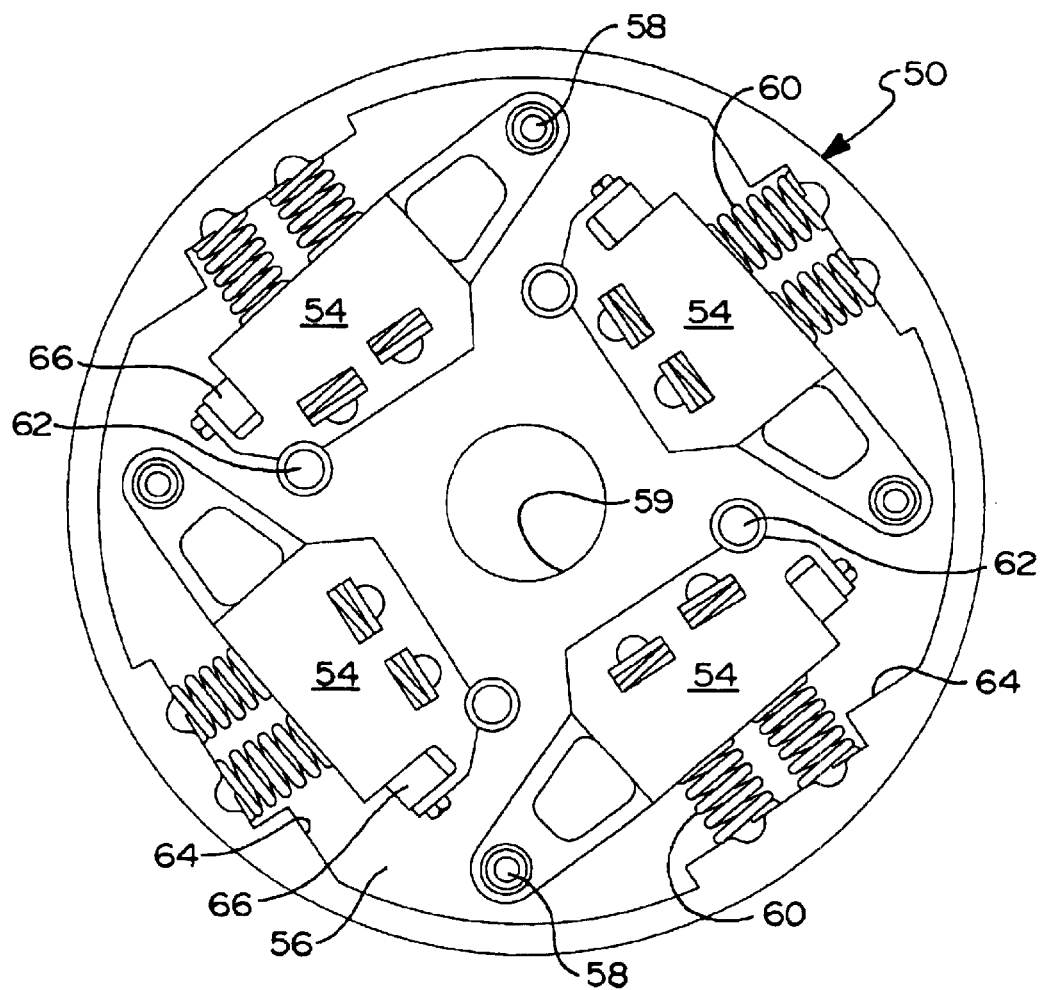
FIG. 4 is a partial top view, in section, of the cover assembly according to an embodiment of the invention.

A more detailed view of the structure of centrifugal clutch 30 is illustrated in FIGS. 3-5. In an embodiment of the invention, clutch 30 includes a first friction plate 44, an intermediate pressure plate 46 and a second friction plate 48. A cover assembly 50, a main pressure plate 52 and intermediate pressure plate 46 mount to an engine flywheel 47 for rotation therewith and function as the input portion 34 of clutch 30. Friction plates 44 and 48 are typically splined to transmission input shaft 38 and function as the output portion 36 of clutch 30.

In the embodiment illustrated in FIG. 4, cover assembly 50 includes four flyweights 54 that are pivotably mounted to a clutch cover 56 at pivot pins 58. Return springs 60 bias flyweights 54 radially inwardly to rest on stops 62 (e.g., FIGS. 4 and 5A). A surface 64 of clutch cover 56 limits the radially outward movement of flyweights 54 (e.g., FIG. 5B). As engine 28 and cover assembly 50 rotate, the effect of centrifugal force will cause flyweights 54 to move outwardly against the biasing force of springs 60 from the position shown in FIG. 5A to the position shown in FIG. 5B. Flyweights 54 each carry one or more rollers 66 or functionally similar wedging member, which will act between a reaction surface and a ramp to provide an axial clamping force for engaging master friction clutch 30.

FIG. 3 is a schematic illustration of the operational members shown in fragments as rotating about a rotational axis 68 of transmission input shaft 38. Rollers 66 are positioned between a generally flat reaction surface 70 on clutch cover 56 and a ramped surface 72 on an axially moveable ramp plate 74. Ramp plate 74 acts on the axially movable main pressure plate 52 through a preloaded spring member 76, such as a diaphragm spring, which limits the axial force applied to pressure plate 52 by ramp plate 74. In response to movement of flyweights 54, main pressure plate 52 applies a clamping force (CF) on the friction pads 78 positioned between surface 80 of the main pressure plate 52 and the intermediate pressure plate 46, as well as surface 82 of the engine flywheel 47. The hub portions 84 and 86 of the friction plates 44 and 48, respectively, are adapted to be splined to input shaft 38 for rotation therewith while components 56, 74, 52, and 46 rotate with the engine flywheel 47.

Figure 2:
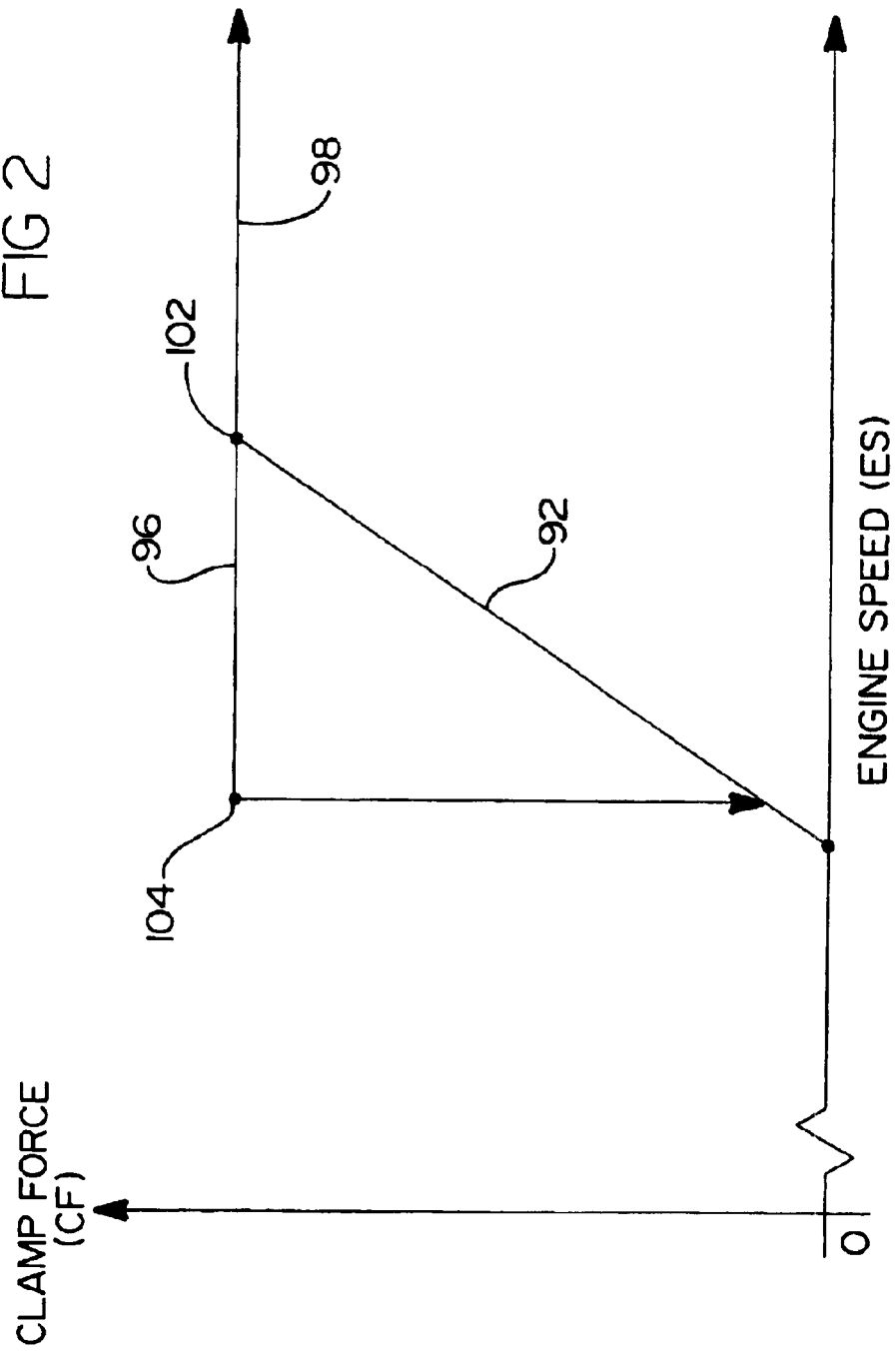
FIG. 2 is a schematic illustration, in graphical format, of the clamping force characteristics of an exemplary centrifugal clutch at various engine speeds.

At rest, one of rollers 66 will engage the recessed portion 88 of surface 72 and will not apply a leftward acting axial clamping force (CF) to friction pads 78. As the roller 66 travels sufficiently radially outwardly and onto a ramped portion 90 of surface 72, an increasing axial clamping force is applied (see, e.g., line 92 of FIG. 2). As the roller moves further radially outwardly onto the flat extended portion 94 of surface 72, the clamp force (CF) will remain at a capped value (see, e.g., lines 96 and 98 of FIG. 2) as limited by spring member 76.

A greater centrifugal force $F_1$ is required to move rollers 66 up ramp portion 90 to flat portion 94 than is required to retain rollers 66 on flat portion 94 against the effect of a radially inward directed spring force $F_2$ generated by return springs 60. This accounts for the difference between the engine speed (ES) value at the initial maximum clamp force (e.g., point 102 in FIG. 2) and the release engine speed value (e.g., point 104 in FIG. 2). The relative masses of flyweights 54 alone or in combination with the spring rate of springs 60 may be modified to change the engine speed value at disengagement (e.g., point 104 in FIG. 2).

Referring to FIGS. 6-12, there is shown an embodiment of a clutch installation device 200 for use in clutch 30 to facilitate installation of clutch 30 into drive-train system 20. Clutch installation device 200 includes an installation hub 202 positioned radially inward of flyweights 54 and a plate member 204, which are shown installed within clutch 30 in FIG. 6. Installation hub 202 and plate member 204 may be manufactured from any durable material, including without limitation, gray iron, graphite-reinforced plastic and steel.

Installation hub 202 is generally cylindrical having a duct 208 that extends from a first end 210 to a second end 212. First end 210 includes flats 214 arrayed in a generally polygonal shape for engagement by a wrench to manually rotate installation hub 202. A cam portion 216 having at least one cam lobe 218 is position between first end 210 and second end 212. Cam lobe 218 selectively engages a flyweight 54 upon rotation of installation hub 202. While the embodiment of installation hub 202 illustrated in FIGS. 7A-7C includes a single cam lobe 218 for engaging one flyweight 54, it is not intended to be limited thereto. For example, in the illustrated embodiment, installation hub 402 may include up to four cam lobes—one for each of the flyweights included in cover assembly 50.

It should be noted that while certain embodiments of cam lobe 218 are shown in the corresponding drawing figures, the terms "cam" and "lobe" should not be so limited, and may describe other types of structures and geometric configurations. However, the profile of cam lobe 218 is generally configured to minimize the load generated at the interface between cam lobe 218 and flyweight 54. In this manner, a relatively low strength material, such as gray iron, may be employed in installation cam 202 without resulting in damage to cam lobe 218 or sacrificing the requisite mechanical advantage needed to manually move flyweight 54.

Figure 6:
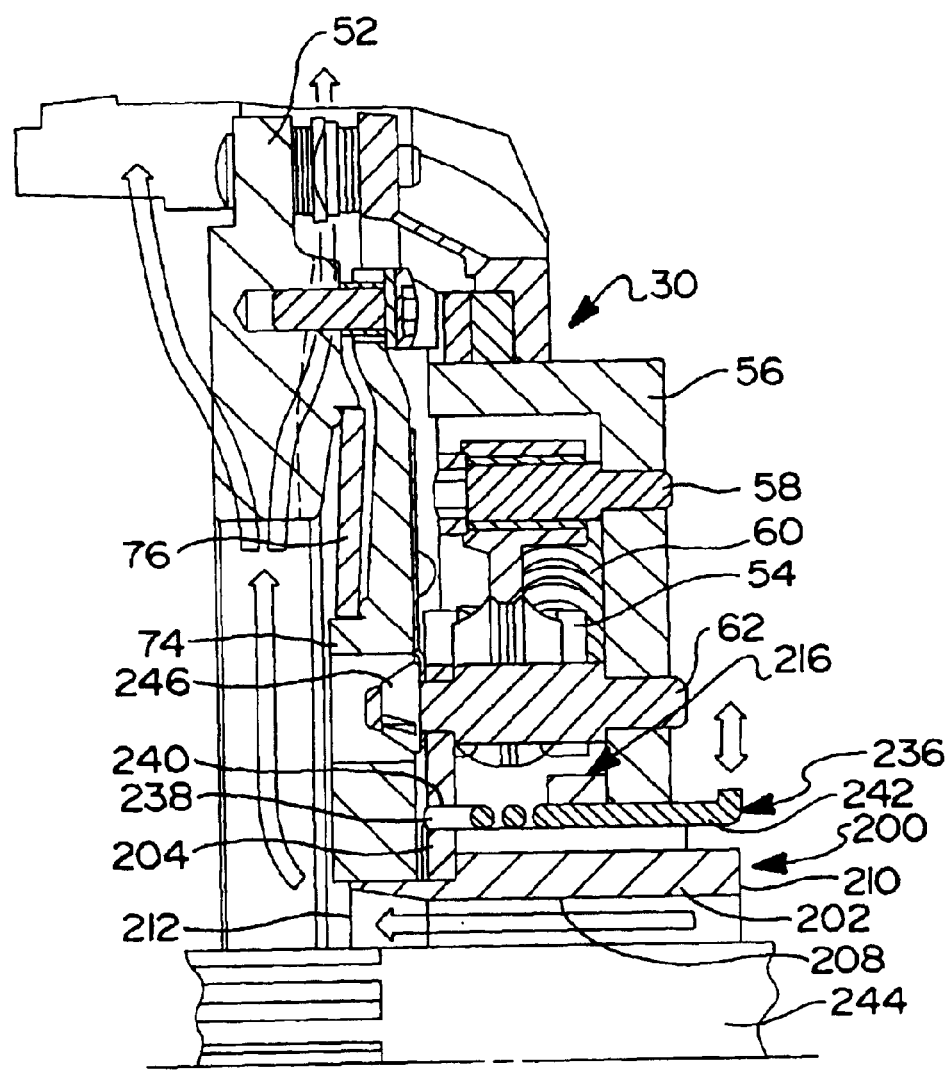
FIG. 6 is a partial cross-sectional view of a centrifugal clutch according to an embodiment of the invention.

Referring to FIGS. 6 and 8, plate member 204 is generally annular and includes apertures 230 that allow passage of stops 62, or other fastening means, to secure plate member 204 to clutch cover 56, as shown in FIG. 6. A radially inner surface 232 of plate member 204 includes outwardly projecting slots 234. Each of slots 234 receives a tab 220 on installation hub 202, which selectively contacts an inner surface of slots 234 to limit the degree of rotation of installation hub 202.

Referring to FIGS. 6 and 9, a torsion spring 236 is disposed between installation hub 202 and plate member 204. Torsion spring 236 includes a first end 238 anchored in a hole 240 in plate member 204 and a second end 242 that extends through cam lobe 218 and exits clutch 30 through clutch cover 56. When installed in clutch 30, torsion spring 236 provides a biasing force against installation hub 202 to resist rotation of installation hub 202 in a predetermined direction.

Figure 10:
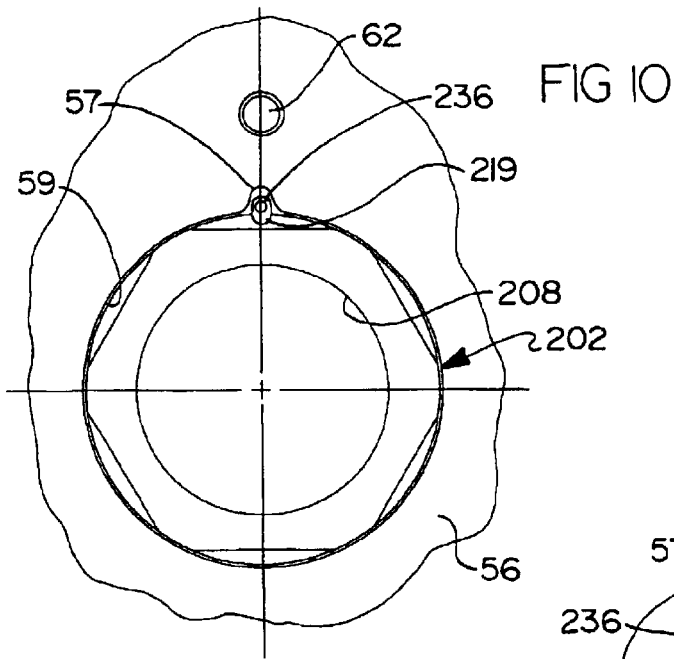
FIG. 10 is a partial front elevational view of a clutch according to an embodiment of the invention, showing the installation hub and the clutch cover prior to or after installation of the clutch into a vehicle drive-train system.

In an embodiment of the invention, installation hub 202 also includes a slot 219 that extends axially along an outer surface of the installation hub 202 through cam lobe 218. Clutch cover 56 is provided with a notch 57 that extends radially outward from a hole 59 through which installation hub 202 extends. As illustrated in FIG. 10, second end 242 of torsion spring 236 extends through slot 219 and into notch 57.

Figure 11:
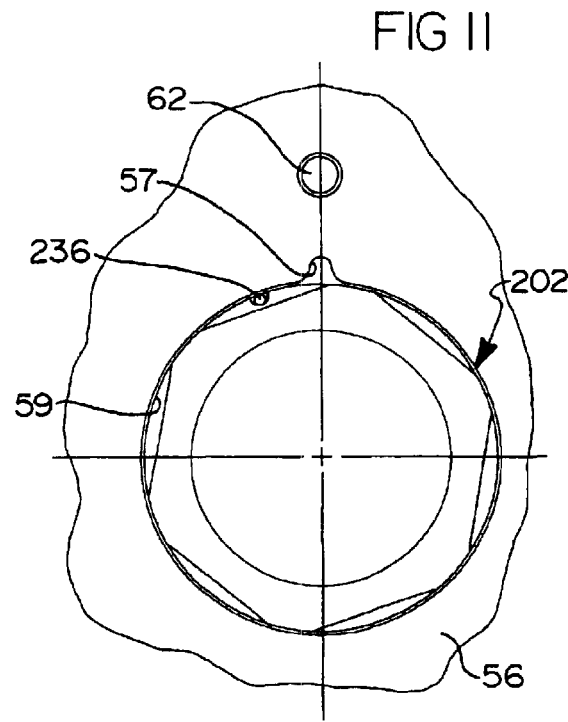
FIG. 11 is a partial front elevational view of the clutch according to an embodiment of the invention showing the position of the installation hub relative to the cover during installation of the clutch into a vehicle drive-train system.

Referring again to FIG. 9, when viewed prior to installation, second end 242 of torsion spring 236 is slightly bent radially outward relative to a longitudinal axis A-A to increase the outwardly directed biasing force when second end 242 is deflected radially inward. The tip of second end 242 may also include an elbow or other configuration. To rotate installation hub 202 relative to clutch cover 56, second end 242 of torsion spring 236 is deflected radially inward into slot 219 until second end 242 clears notch 57, as shown in FIG. 11. Upon return rotation of installation hub 202 to the position shown in FIG. 10, second end 242 "snaps" back into notch 57 to inhibit rotation of installation hub 202 during use of clutch 30.

Figure 12:
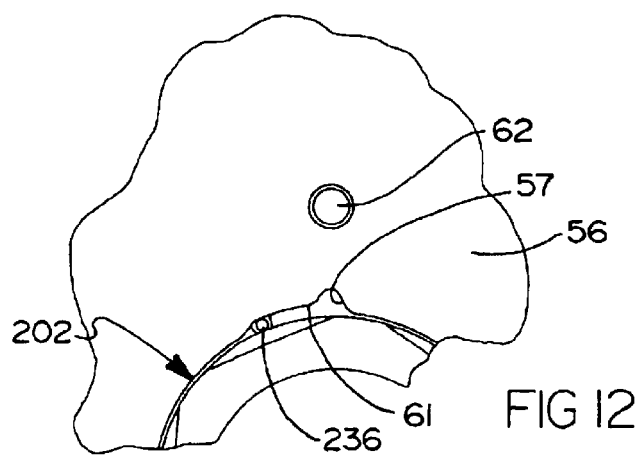
FIG. 12 is a partial front elevational view of a clutch according to another embodiment of the invention showing the position of the installation hub relative to the clutch cover during installation of the clutch into a vehicle drive-train system.

In another embodiment shown in FIG. 12, installation hub 202 does not include slot 219; however, torsion spring 236 still extends through a hole in cam lobe 218. Instead, clutch cover 56 includes an angular slot 61 that extends from notch 57. To rotate installation hub 202 relative to clutch cover 56, second end 242 of torsion spring 236 is deflected radially inward until second end clears notch 57 and is received into slot 61. Upon return rotation of installation hub 202, second end 242 "snaps" back into notch 57 to inhibit rotation of installation hub 202 during use of clutch 30.

An embodiment of the installation of centrifugal clutch 30 into the exemplary vehicle drive-train system 20 and operation of installation device 200 will be described with reference to FIGS. 6-12. The terms "clockwise" and "counterclockwise," as used herein, describe the rightward and leftward rotation, respectively, of installation cam 202. However, the direction of rotation of the components described herein is not intended to limit the scope of the invention, as it will be appreciated that installation cam 202 can be configured to rotate in a direction opposite the direction of rotation depicted in the drawings.

Cover assembly 50 is prepared for installation by assembling flyweights 54 and stop posts 62 to clutch cover 56. Installation hub 202 and torsion spring 236 are then positioned in clutch cover 56 and plate member 204 is secured over installation hub 202 using caps 246 attached to stop posts 62. The remaining components of cover assembly 50, including without limitation, ramp plate 74 and pressure plate 52, are then attached to cover assembly 50 in a manner well known in the art.

Once cover assembly 50 is assembled, installation hub 202 is rotated in a counter-clockwise direction from the position illustrated in FIG. 10 toward the position illustrated in FIG. 11, against the biasing force of torsion spring 236. To release installation hub 202 for rotation, second end 242 of torsion spring 236 is deflected radially inward toward installation shaft 244 until second end 242 clears notch 57 in clutch cover 56 and installation hub 202 is free to rotate.

As installation cam 202 is rotated, cam lobe 218 contacts a flyweight 54 causing it to rotate outward against the biasing force of springs 60 (reference, for example, FIGS. 5A and 5B). As the engaged flyweight 54 is rotated outward, roller 66 travels up ramp 90 forcing ramp plate 74, spring member 76, and pressure plate 52 to move away from clutch cover 56. The distance ramp plate 74, spring member 76, and pressure plate 52 are moved away from clutch cover 56 is substantially equal to the clutch engagement/disengagement travel plus the deflection distance of spring member 76 required to cause a sufficient clamping force (CF) against friction plates 44, 48 after installation shaft 244 is removed from clutch 30.

During rotation of installation hub 202, tabs 220 engage the inner surface of slots 234, which limits the degree of counter-clockwise rotation of installation hub 202 to ensure that cam lobe 218 is in the correct position to provide the needed lift to flyweight 54. As torsion spring 236 is stressed, a biasing force is generated against installation hub 202 in a direction opposite the direction of rotation. When installation hub 202 is rotated to the position shown in FIG. 11, the biasing force of torsion spring 236 presses cam lob 218 against the engaged flyweight 54 to "lock" or otherwise inhibit rotation of installation cam 202. Once installation cam 202 is rotated to the position shown in FIG. 11, cover assembly 50 can be secured to engine flywheel 47.

In preparation of securing cover assembly 50 to engine flywheel 47, friction plates 44, 48 are positioned adjacent engine flywheel 47 using installation shaft 244. Cover assembly 50 is then secured to flywheel 47 by a plurality of mounting bolts (not illustrated), as is generally known in the art. As the mounting bolts are tightened, cover assembly 50, and more particularly pressure plate 52, are drawn against the friction plates 44, 47 applying a clamping force (CF)

through the compression of spring member 76. As described above, spring member 76 is compressed due to the position of ramp plate 74 caused by the outward rotation of the engaged flyweight 54. After fully tightening all of the mounting bolts, installation shaft 244 may be removed allowing the clamping force (CF) applied by cover assembly 50, and more particularly pressure plate 52, to hold friction plates 44, 48 in their correct alignment position for receipt of transmission input shaft 38.

After transmission 22 is installed and engine 18 is capable of being started, the clutch installation device 200 may be "unlocked" permitting use of the vehicle. To "unlock" installation hub 202, a sufficient torque must applied to installation hub 202 in a clockwise direction and/or further outward rotation of the engaged flyweight 54 is required. In an embodiment, engine 18 is started with transmission 22 in neutral and the engine speed (ES) is increased to a predetermined engine speed. The predetermined engine speed is based on factors, such as, for example, the biasing force of spring members 60 and the mass of flyweights 54. During the increase in engine speed, flyweights 54 rotate outward due to centrifugal force, separating the engaged flyweight 54 from cam lobe 218. Upon separation, the biasing force of torsion spring 236 causes installation hub 202 to rotate back to the position shown in FIG. 10. Once aligned with notch 57, second end 242 of torsion spring 236 "snaps" back into notch 57 to maintain installation hub 202 in the position shown in FIG. 10. during normal operation and use of clutch 30.

During normal operation of clutch 30 in drive-train system 20, airflow is channeled substantially between transmission input shaft 38 (represented by installation shaft 244 in FIG. 6) and installation hub 202 behind ramp plate 74 and into the area surrounding friction plates 44 and 48, as represented by the arrows in FIG. 6. Inhibiting airflow into the area surround flyweights 54 significantly reduces contamination build-up in cover assembly 50 and promotes reliable operation of the centrifugal components of clutch 30. The airflow directed between installation hub 202 and transmission input shaft 38 also increases the cooling rate of friction plates 44, 48. Installation hub 202 may optionally include at least one airflow passage (see, e.g., passages 311 and 411 in FIGS. 13-16). Airflow passages 313, 413 permit the inside diameter of duct 208 to be reduced, which facilitates alignment of transmission input shaft 38 during assembly into drive-train system 20.

Figure 13:
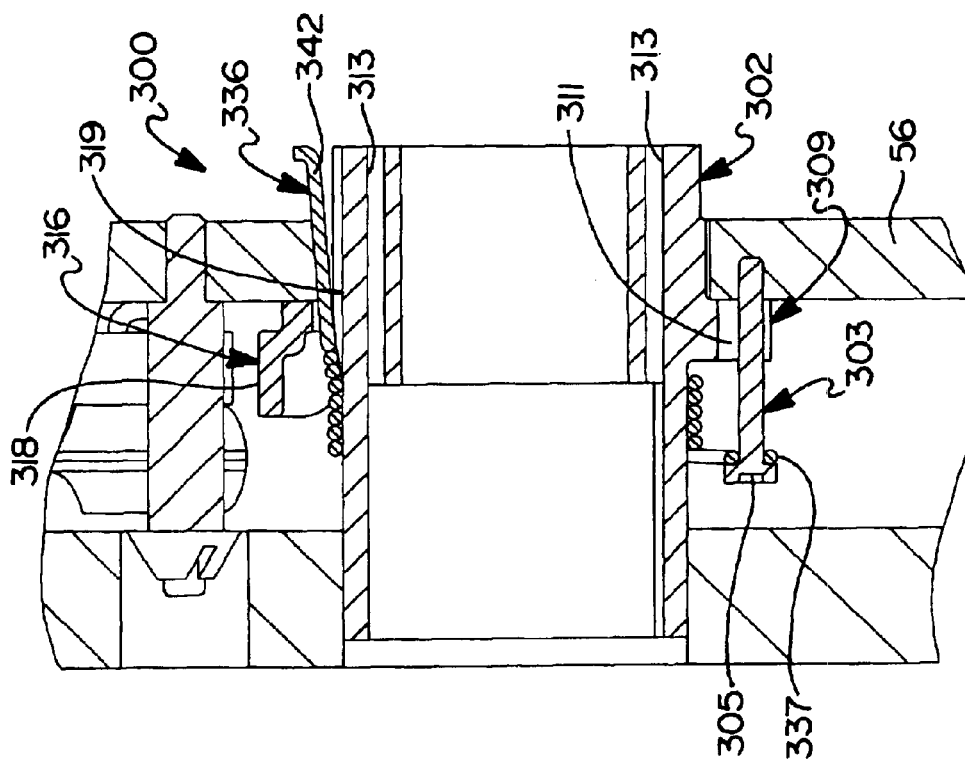
FIG. 13 is a cross-sectional view of a clutch installation device according to another embodiment of the invention.
Figure 14:
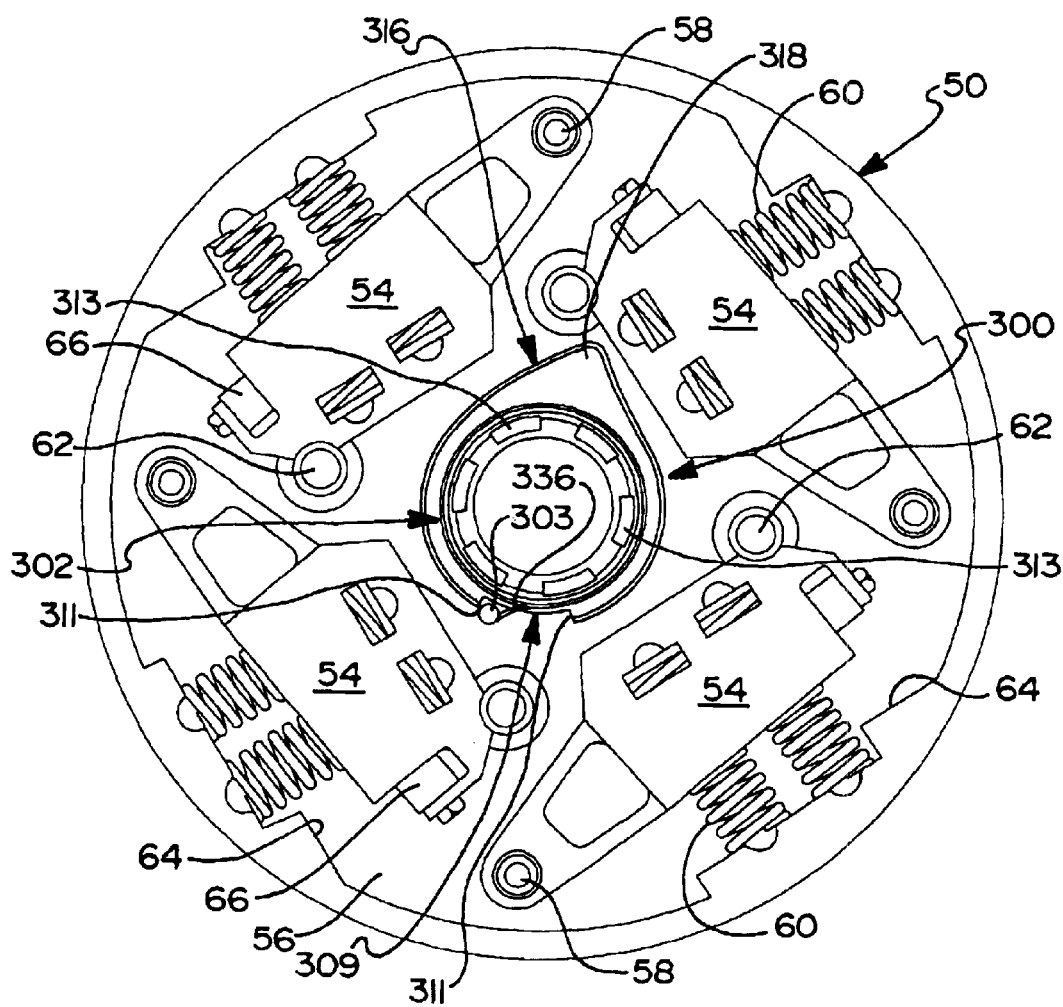
FIG. 14 is a partial top view, in section, of a clutch cover, centrifugal mechanism, and clutch installation device shown in FIG. 13.

Referring to FIGS. 13 and 14, another embodiment of the present invention is shown. In this embodiment, an installation device 300 is provided that includes an installation hub 302. When rotated, installation hub 302 pushes at least one mass weight 54 radially outward to force pressure plate 52 against the driven disks 44, 48 during installation of cover assembly 50 onto flywheel 47. Like installation hub 202 described above, installation hub 302 is spring-loaded to rotate back to an "unlocked" position when mass weights 54 are rotated outward due to centrifugal force.

In the embodiment illustrated in FIGS. 13 and 14, a torsion spring 336 is anchored to a threaded fastener 303, such as a bolt. Torsion spring 336 includes a looped end 337, through which fastener 303 extends before is it threaded into a corresponding hole in clutch cover 56. A head portion 305 of fastener 303 prevents looped end 337 from sliding off of fastener 303 during installation and use of clutch 30.

To accommodate the second end 442 of torsion spring 436, installation hub 402 includes a slot 319. Slot 319 permits second end 342 to be deflected radially inward to release installation hub 302 for rotation. However, as also noted above, installation hub 302 may only include a hole through cam lobe 318 when cover assembly is configured as shown in FIG. 12.

To limit rotation of installation hub 302, a recess 309 is formed in cam portion 316. Recess 309 is defined by a pair of radially extending surfaces 311, which selectively contact fastener 303 as installation hub 302 is rotated. During assembly of installation device 300 into cover assembly 50, torsion spring 336 may be "pre-loaded" prior to fastener 303 being inserted between surfaces 311. Installation device 300 is assembled to cover assembly 50 by inserting installation hub 302 through hole 59 and securing fastener 303 to clutch cover 56. Operation of installation device 300 is substantially similar to operation of installation device 202 described above.

Figure 15:
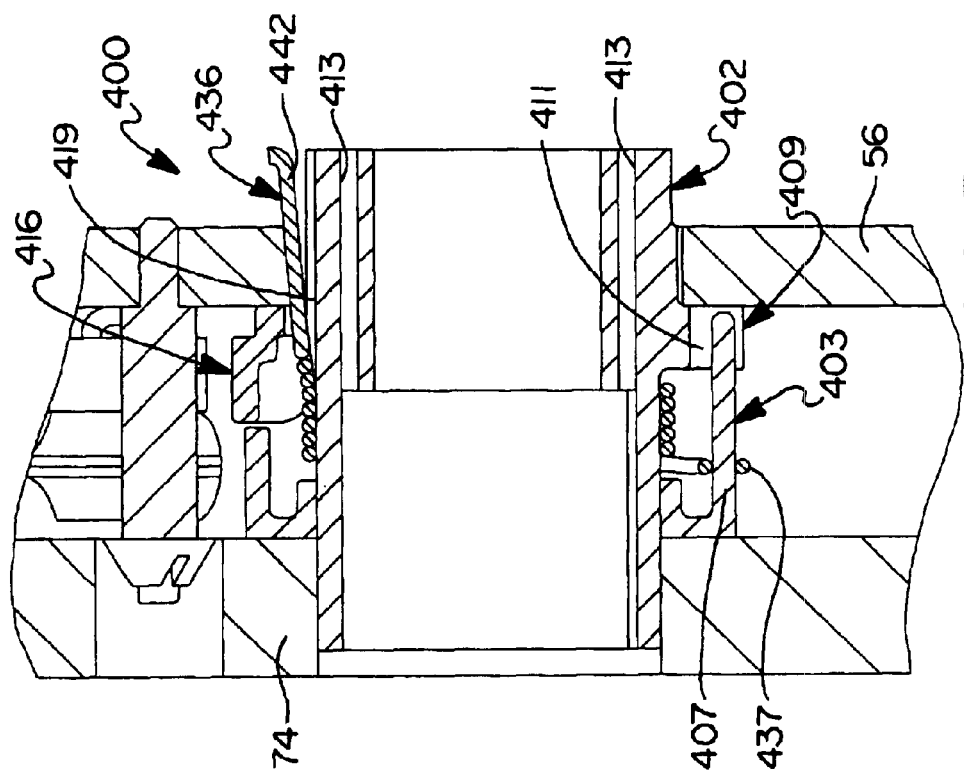
FIG. 15 is a cross-sectional view of a clutch installation device according to another embodiment of the invention.
Figure 16:
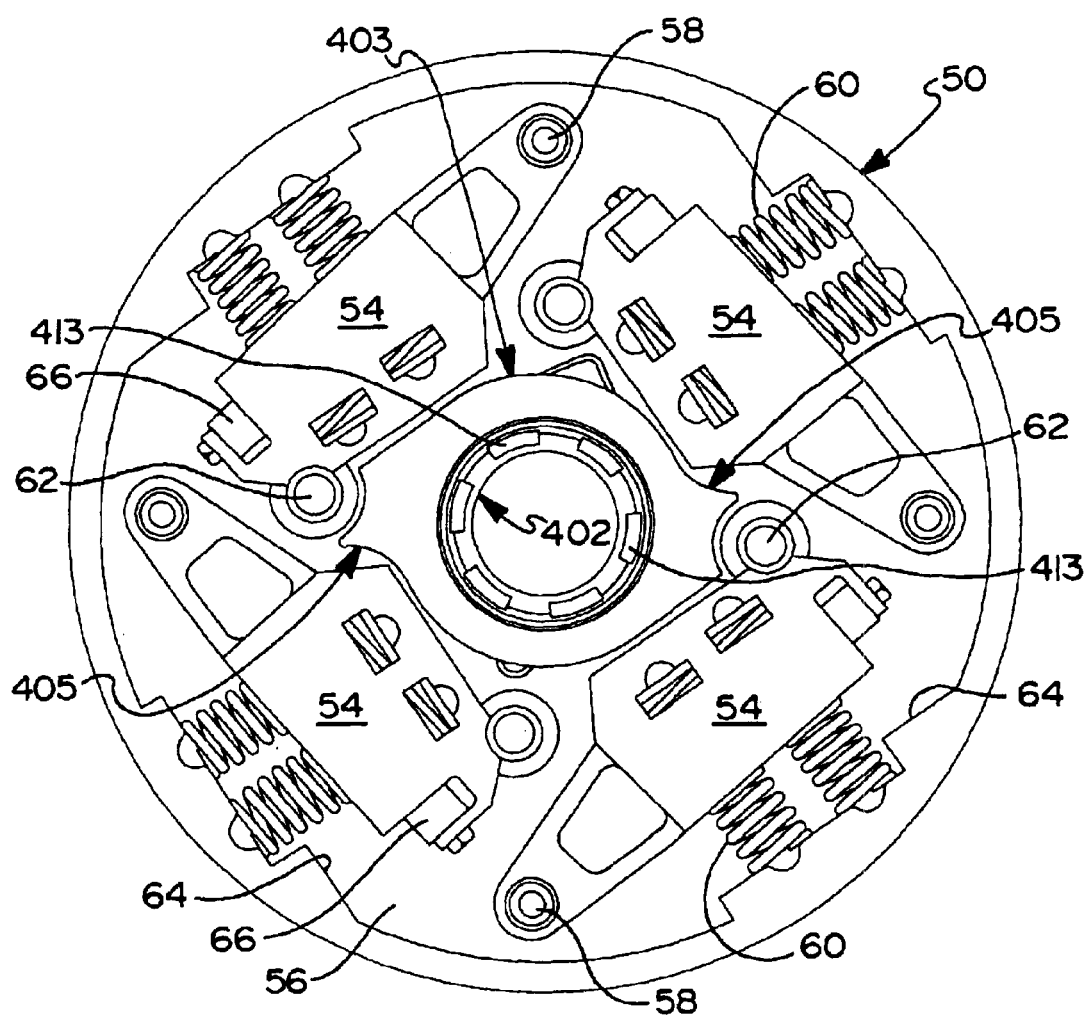
FIG. 16 is a partial top view, in section, of a clutch cover, centrifugal mechanism, and clutch installation device shown in FIG. 15.

Referring to FIGS. 15 and 16, another embodiment of the present invention is shown. In this embodiment, an installation device 400 is disclosed that includes an installation hub 402, which is substantially similar to installation hub 302 described above, and a support hub 403. Installation device 400 includes a torsion spring 436 disposed between installation hub 402 and support hub 403. The load produced by rotation of torsion spring 436 reacts against support hub 403 to impart a rotational biasing force on installation hub 402.

To counter the reactionary force imposed by torsion spring 436 on support hub 403, support hub 403 includes at least one recessed lobe 405 that at least partially surrounds stop bolt 62. Recessed lobe 405 reacts against stop bolt 62 and inhibits rotation of support hub 403 as installation hub 402 is rotated against the biasing force of torsion spring 436. While the embodiment of support hub 405 illustrated in FIG. 16 includes two recessed lobes 405, it is possible to use a single recessed lobe or more than two recessed lobes to inhibit rotation of support hub 403 relative to installation hub 402. For example, in the illustrated embodiment, support hub 403 could include up to four recessed cam lobes 405—one for each stop bolt 62 shown in FIG. 16.

Support hub 403 also includes a post 407 that extends toward clutch cover 56. To limit rotation of installation hub 402, a recess 409 is formed in cam portion 416. Recess 409 is defined by a pair of radially extending surfaces 411, which selectively contact post 407 as installation hub 402 is rotated. Post 407 may abut the inner surface of clutch cover 56, may be slightly removed from the inner surface of clutch cover 56, or may be received in a hole in clutch cover 56 to inhibit deflection of post 407 due to the forces imposed on post 407 by torsion spring 436.

Torsion spring 436 includes a looped end 437 through which post 407 extends. In an embodiment, looped end 437 is pressed onto post 407 to anchor torsion spring 436 to support hub 403. Alternatively, a separate retaining member (not shown) could be used to secure looped end 437 on post 407. Any suitable retaining member is contemplated, including without limitation, snap rings and grip rings. While looped end of torsion spring 436 does not need to be secured to post 407, fixing the components together permits installation hub 402, support hub 403 and torsion spring 436 to be pre-assembled and easily handled without the components coming apart during assembly onto cover assembly 50. When pre-assembled, support hub 403 may be rotated relative to installation hub 402 to "pre-load" torsion spring 436 prior to inserting post 407 between surfaces 411.

To accommodate the second end 442 of torsion spring 436, installation hub 402 includes a slot 419. Slot 419 permits second end 442 to be deflected radially inward to release installation hub 402 for rotation. However, as also noted above, installation hub 402 may only include a hole through cam lobe 418 when cover assembly 50 is configured as shown in FIG. 12.

Installation device 400 is assembled into cover assembly 50 before cover assembly 50 is secured to flywheel 47, as described above. As shown in FIG. 15, support hub 403 may abut ramp plate 74 when cover assembly 50 is secured to engine flywheel 47. Axial movement of installation hub 402 is limited by support hub 403, which is selectively contacted by installation hub 402 when an axial force is applied to installation hub 402. Operation of installation device 402 is substantially similar to operation of installation device 202 described above.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. An installation device for use in a centrifugal clutch including an output portion having at least one friction plate and an input portion that includes a clutch cover, a pressure plate for applying a clamping force against the friction plate, and at least one flyweight that moves radially outward under the effects of centrifugal force to cause the pressure plate to exert a clamping force against the friction plate, the installation device comprising:
   an installation hub moveable relative to the clutch cover between a first position, wherein the installation hub is engaged with the at least one flyweight to force the engaged flyweight to move radially outward, and a second position, wherein the installation hub is disengaged from the flyweight;
   a resilient member biasing the installation hub toward the second position, the resilient member being selectively engaged with the clutch cover to inhibit movement of the installation hub toward the first position; and
   whereby when the engaged flyweight is moved radially outward, the axial position of the pressure plate is modified such that the pressure plate provides a clamping force against the friction plate.

2. The installation device of claim 1, wherein the installation hub selectively engages a movement limiting member.

3. The installation device of claim 2, wherein the movement limiting member is an annular plate.

4. The installation device of claim 3, wherein the resilient member is anchored to the annular plate.

5. The installation device of claim 2, wherein the movement limiting member is a threaded fastener secured to clutch cover.

6. The installation device of claim 5, wherein the resilient member is anchored to the threaded fastener.

7. The installation device of claim 2, wherein the movement limiting member is a support hub.

8. The installation device of claim 7, wherein the resilient member is anchored to the support hub.

9. The installation device of claim 7, wherein the support hub includes a post to which the resilient member is anchored.

10. The installation device of claim 7, wherein the centrifugal clutch includes at least one stop member to limit inward movement of the flyweight, the support hub being selectively engagable with the stop member to inhibit rotation of the support hub relative to the installation hub.

11. The installation device of claim 2, wherein the resilient member includes a first end anchored to the movement limiting member and a second end selectively engagable with the clutch cover.

12. The installation device of claim 11, wherein the clutch cover includes a notch within which the second end is selectively received to inhibit movement of the installation hub toward the first position.

13. The installation device of claim 12, wherein the second end is deflectable out of the notch to permit movement of the installation hub toward the first position.

14. An installation device for use in a centrifugal clutch that includes an output portion having at least one friction plate and an input portion that includes a clutch cover, a pressure plate for applying a clamping force against the friction plate, and at least one flyweight that moves radially outward under the effects of centrifugal force to cause the pressure plate to exert a clamping force against the friction plate, the installation device comprising:
   an installation hub rotatable relative to the clutch cover and selectively engaged with the at least one flyweight to force the engaged flyweight to move radially outward;
   a rotation limiting member;
   a resilient member rotationally biasing the installation hub, the resilient member including a first end anchored to the rotation limiting member and a second end selectively engaged with the clutch cover; and
   whereby when the engaged flyweight is moved radially outward, the axial position of the pressure plate is modified such that the pressure plate provides a clamping force against the friction plate.

15. An installation device for use in a clutch having a centrifugal engagement mechanism, comprising:
   an installation hub moveable to selectively operate the centrifugal engagement mechanism;
   a movement limiting member selectively engaging the installation hub; and
   a resilient member disposed between the installation hub and the movement limiting member and providing a biasing force against movement of the installation hub in a predetermine direction, the resilient member selectively engaging a portion of the clutch to inhibit movement of the installation hub.

16. A centrifugal clutch comprising an output portion that includes at least one friction plate and an input portion including a clutch cover, a pressure plate for applying a clamping force against the friction plate, at least one flyweight that moves radially outward under the effects of centrifugal force to cause the pressure plate to exert a clamping force against the friction plate, and a clutch installation device comprising:

an installation hub moveable relative to the clutch cover between a first position, wherein the installation hub is engaged with the at least one flyweight to force the engaged flyweight to move radially outward, and a second position, wherein the installation hub is disengaged from the flyweight;

a resilient member biasing the installation hub toward the second position, the resilient member being selectively engaged with the clutch cover to inhibit movement of the installation hub toward the first position; and whereby when the engaged flyweight is moved radially outward, the axial position of the pressure plate is modified such that the pressure plate provides a clamping force against the friction plate.

* * * * *